United States Patent
Zhang

(10) Patent No.: US 9,422,866 B2
(45) Date of Patent: Aug. 23, 2016

(54) GAS TURBINE CONTROLLER AND A METHOD FOR CONTROLLING A GAS TURBINE

(75) Inventor: Xiao-Yi Zhang, Niederrohrdorf (CH)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 1119 days.

(21) Appl. No.: 13/608,769

(22) Filed: Sep. 10, 2012

(65) Prior Publication Data

US 2014/0026587 A1     Jan. 30, 2014

(30) Foreign Application Priority Data

Sep. 8, 2011   (EP) .................................... 11180563

(51) Int. Cl.
   *F02C 7/22*   (2006.01)
   *F02C 9/28*   (2006.01)
   *F02C 9/56*   (2006.01)
   *F02C 9/54*   (2006.01)

(52) U.S. Cl.
   CPC . *F02C 7/22* (2013.01); *F02C 9/28* (2013.01); *F02C 9/54* (2013.01); *F05D 2270/083* (2013.01)

(58) Field of Classification Search
   CPC .............. F02C 9/28; F02C 9/54; F02C 3/30; F02C 7/22; F05D 2270/083
   See application file for complete search history.

(56) References Cited

U.S. PATENT DOCUMENTS

| | | | | |
|---|---|---|---|---|
| 3,826,080 A | * | 7/1974 | De Corso et al. | 60/39.55 |
| 4,160,362 A | * | 7/1979 | Martens et al. | 60/39.182 |
| 4,259,837 A | * | 4/1981 | Russell et al. | 60/39.55 |
| 4,733,527 A | * | 3/1988 | Kidd | 60/775 |
| 5,083,277 A | * | 1/1992 | Shutler | 701/100 |
| 5,133,182 A | | 7/1992 | Marcos | |
| 5,307,619 A | * | 5/1994 | McCarty et al. | 60/775 |
| 5,357,741 A | * | 10/1994 | Talabisco et al. | 60/775 |
| 5,487,265 A | | 1/1996 | Rajamani et al. | |
| 5,634,327 A | | 6/1997 | Kamber et al. | |
| 5,636,507 A | | 6/1997 | Rajamani et al. | |
| 5,896,736 A | | 4/1999 | Rajamani | |
| 6,704,620 B1 | * | 3/2004 | Kutzner et al. | 700/287 |
| 2003/0217553 A1 | * | 11/2003 | Gadde et al. | 60/775 |
| 2010/0287943 A1 | | 11/2010 | McMahan et al. | |
| 2011/0277482 A1 | | 11/2011 | Mosley et al. | |

FOREIGN PATENT DOCUMENTS

| | | |
|---|---|---|
| EP | 0 718 470 A2 | 6/1996 |
| EP | 2 386 741 A2 | 11/2011 |

OTHER PUBLICATIONS

European Search Report for EP 11180563.6 dated Jan. 19, 2012.
Office Action issued on May 29, 2014, by the Russian Patent Office in corresponding Russian Patent Application No. 2012138476/06(062327), and an English Translation of the Office Action. (9 pages).

* cited by examiner

*Primary Examiner* — Carlos A Rivera
(74) *Attorney, Agent, or Firm* — Buchanan Ingersoll & Rooney PC

(57) ABSTRACT

Exemplary embodiments relate to a method and system for transient operating of a gas turbine. Operation of the gas turbine the controller determines command values for an inlet air mass flow, fuel mass flow, and for a water or steam mass flow. In order to allow fast transient operation with a stable premix flame at least one command value is dynamically compensated to compensate for the different system dynamics of the supply systems to synchronize the resulting changes in fuel, water, steam, and/or combustion air mass flows, which reach the combustor, so that the fuel to air ratio stays within the combustible limit.

7 Claims, 3 Drawing Sheets

GAS TURBINE CONTROLLER AND A METHOD FOR CONTROLLING A GAS TURBINE

RELATED APPLICATION

This application claims priority under 35 U.S.C. §119 to European application 11180563.6 filed in Europe on Sep. 8, 2011, the entire content of which are hereby incorporated by reference in their entirety.

FIELD

The disclosure relates to a gas turbine controller, such as a method for controlling operation of a gas turbine and to a gas turbine model with a controller configured to carry out such a method.

BACKGROUND INFORMATION

Modern gas turbines can operate with lean premix flames to meet emission specifications. To assure a stable combustion for all operating conditions, complex operating methods have been designed as for example known from EP0718470.

In addition to the low emissions, the market specification with regard to transient operation capabilities of gas turbines in utility use are becoming more and more stringent. Besides normal frequency support features, gas turbines in local electrical grids can be called for to maintain the grid frequency under various conditions, including emergencies, such as, loss of national grid connection or trip of a large consumer. Gas turbines should be capable of changing their power outputs very quickly in order to keep the generated power and the consumed power balanced in the local grid.

One prerequisite for fulfilling these transient operation specification involves combustion stability during rapid transients. However, lean premixing combustion, which is a known technology for dry NOx emission reduction, can have a relatively narrow flammability range. The flammability limits of a lean premix flame are for example much narrower than those of a diffusion flame; can be approximately one order of magnitude smaller. The flammability limits describe the stability of flames. In addition, water and steam injections are popular methods for power augmentation and for wet NOx reduction. They also affect combustion stability.

The flammability limits can easily be exceeded during fast transient operation if known operating methods are carried out based on measured values and with direct command to actuators and control valves.

FIG. 1 shows an example of a gas turbine control system in accordance with a known implementation. FIG. 1 shows an example of a conventional gas turbine control system 30, actuators 41-49 supply channels 21, . . . , 29 to a combustor 3. The control system itself includes a controller 10, and control lines 11-19. Based on measured operating conditions, and operating targets the controller 10 determines the command mass flows for i fuel flows $\dot{m}_{fuel,i}^{CMD}$, for j water/steam mass flow $\dot{m}_{w/s,j}^{CMD}$, and for k air mass flows $\dot{m}_{air,k}^{CMD}$. Based on these command mass flows the actuators for fuel supply 41, . . . , 43, the actuators for water/steam supply 44, . . . , 47, and the actuators for air supply change their position leading to a fuel gas mass flow at the actuators $\dot{m}_{fuel,i}^{ACTUR}$, water/steam mass flow j at the actuators $\dot{m}_{w/s,j}^{ACTUR}$, and air mass flow k at the actuator, i.e. VIGV $\dot{m}_{air,k}^{ACTUR}$.

Ideally the mass flows entering the combustor 3 follow the commanded mass flow strictly. However this is not the case in a real engine because the fuel, water/steam and air supply channels have different shapes and volumes, and hence, possess different system dynamics.

Due to the different dynamics of the actuators, and of the fuel supply channels 21, . . . , 23, the water/steam supply channels 24, . . . , 26, and the air supply channels 27, . . . , 29, changes in the actual i fuel mass flows $\dot{m}_{fuel,i}^{CMBST}$, the actual j water/steam mass flows reaching the combustor inlet $\dot{m}_{w/s,j}^{CMBST}$, and the actual k air mass flows $\dot{m}_{air,k}^{CMBST}$ are not synchronized, even if the command signals are synchronized and therefore can lead to combustion instabilities.

SUMMARY

An exemplary method for operating a gas turbine during transient operation is disclosed, the gas turbine including a compressor with variable inlet guide vanes, a combustor, a turbine, a controller, measurement devices, actuators, inlet air supply channels and supply channels for fuel gas, and/or liquid fuel, and/or supply channels for water and/or steam, the method comprising: determining command values for an inlet air mass flow and at least one of fuel mass flow and water and/or steam mass flow, wherein at least one command value is dynamically compensated in at least one command value to compensate for differences in system dynamics of supply systems; and synchronizing changes in at least two of fuel mass flow, water, steam mass flow, and combustion air mass flow entering the combustor (e.g., fuel mass flow with at least one of water, steam mass flow and combustion air mass flow), so that a fuel to air ratio stays within a combustible limit.

An exemplary control system for controlling a gas turbine is disclosed, the gas turbine having a compressor with variable inlet guide vanes, a combustor, a turbine, a controller, measurement devices, actuators, and inlet air supply channels, and supply channels for at least one of fuel, water, and steam, wherein the controller determines command values for an inlet air mass flow and at least one of fuel mass flow, water mass flow steam mass flow, a dynamic compensator for the fuel supply; a dynamic compensator for at least one of the water and steam supply; and a dynamic compensator for the air supply to the combustor, the control system comprising: a processor configured to correct at least one command signal during transient operation to compensate for differences in the supply system dynamics to synchronize resulting changes in at least one of the fuel, water, steam, and combustion air mass flow, which enter the combustor, so that a fuel to air ratio stays within combustible limit.

BRIEF DESCRIPTION OF THE DRAWINGS

The disclosure, its nature as well as its advantages, shall be described in more detail below with the aid of the accompanying drawings. Referring to the drawings.

DETAILED DESCRIPTION

Figure 1:
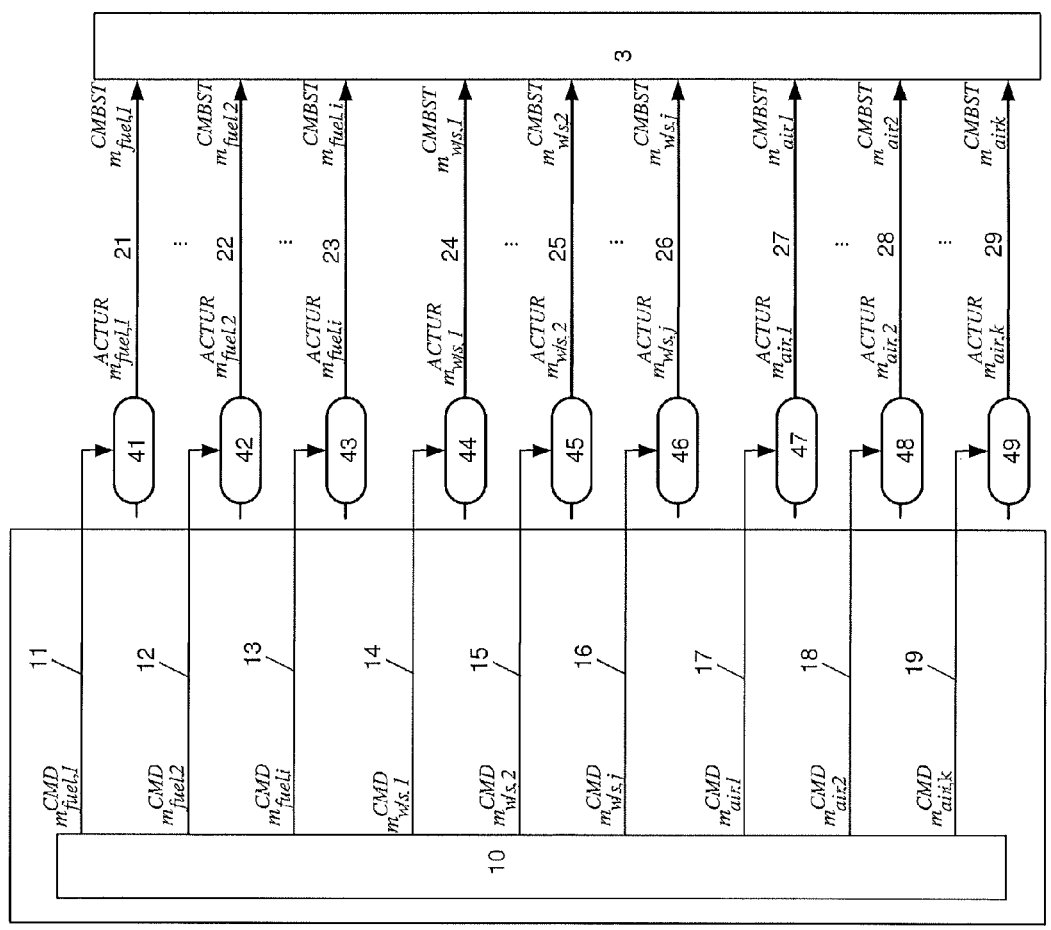
FIG. 1 shows an example of a gas turbine control system in accordance with a known implementation.

Exemplary embodiments of the present disclosure are directed to a method for operation of a gas turbine, which allows fast transient operation with synchronized changes in fuel, water/steam and airflows entering the combustor of a gas turbine. As a result speed of transient changes can be increased and flame stability can be maintained during these fast transients. Exemplary embodiments disclosed herein are further directed to a control system designed to carry out dynamic compensation and a gas turbine comprising such a controller.

The relation between the mass flow of fuel channel i at the actuator, $\dot{m}_{fuel,i}^{ACTUR}$, and at the combustor inlet $\dot{m}_{fuel,i}^{CMBST}$ can normally be expressed by a transfer function as follows:

$$L(\dot{m}_{fuel,i}^{CMBST}) = G_{fuel,i}(s) \cdot L(\dot{m}_{fuel,i}^{ACTUR}) \quad \text{equation 1}$$

where L( ) denotes Laplace transform. $G_{fuel,i}(s)$ the transfer function that represents the system dynamics of fuel channel i. Their correlation depends on the shape and volume of fuel channel i.

Corresponding correlations also exist for water/steam, and air supply channels $$L(\dot{m}_{W/S,j}^{CMBST}) = G_{W/S,j}(s) \cdot L(\dot{m}_{W/S,j}^{ACTUR}) \quad \text{equation 2}$$

$$L(\dot{m}_{air,k}^{CMBST}) = G_{air,k}(s) \cdot L(\dot{m}_{air,k}^{ACTUR}) \quad \text{equation 3}$$

where, $\dot{m}_{W/S,j}^{ACTUR}$ and $\dot{m}_{W/S,j}^{CMBST}$ are the mass flows in the water/steam channel j at the actuator, and at the combustor inlet, respectively. $\dot{m}_{air,k}^{ACTUR}$, and $\dot{m}_{air,k}^{CMBST}$ are the mass flows of air channel k at the actuator, and at the combustor inlet, respectively. $G_{w/s,j}(s)$, and $G_{air,k}(s)$ are the transfer functions describing the system dynamics.

Exemplary embodiments of the present disclosure are directed to the advantages achieved if at least one of the commanded mass flows is compensated for differences in dynamic behavior of the supply systems.

To compensate for differences in the dynamic behavior an exemplary method for operating a gas turbine during transient operation is disclosed herein. The method being performed in conjunction with gas turbines, which include a compressor with variable inlet guide vanes, a combustor, a turbine, a controller, measurement devices, actuators, and supply channels for inlet air, and at least for one of fuel gas, liquid fuel, water, and steam.

Besides pressure and temperature boundary conditions the flame stability can be determined by the mass flows, which enter a combustor. According to the proposed method a controller determines command values for the inlet air mass flow, and at least one command value for one of: the fuel gas mass flow, the liquid fuel mass flow, the water mass flow, and the steam mass flow. In order to synchronize the resulting changes in fuel, water, steam, and/or combustion air supply, which enter the combustion chamber, least one command value can be dynamically compensated. By compensating the system dynamics of the actuators, and/or supply channels the fuel to air ratio stays within the combustible limit. In the context of the present disclosure, a supply system includes supply channels, actuators, and control elements.

The dynamics of the different supply systems vary in speed. Speed can be limited to the speed of the slowest system. The speed of transient change depends among others on the ratio of the fuel distribution system's volume and the fuel gas volume flow. A fuel gas system, which comprises fuel gas channels with a large volume downstream of a control valve, has slow dynamics because changes in the valve position do not immediately affect the fuel gas flow into the combustor. For example, after an opening of the control valve the large volume of the fuel gas distribution system has to be further pressurized before the fuel flow into the combustor increases to the desired value. However, transient changes can be accelerated by a controlled signal acceleration. For example a control valve can be opened further than needed to reach a new operating point for a short period of time before reducing the valve opening back to the intended steady state position and a controlled fine-tuning.

In a further exemplary embodiment of the present disclosure changes in at least one command value can be accelerated. Specifically, in order to moderate the slow dynamics of the air, fuel gas, liquid fuel, water and/or steam supply systems changes in at least one command value are accelerated. The command value can be accelerated before or after the value is dynamically compensated in order to allow faster transient changes in operation. The acceleration and compensation can also be combined.

According to another exemplary embodiment of the disclosure at least one control signal from the controller is compensated before it is sent to the corresponding actuator. The compensation can be done in the control system itself. For this the controller can be virtually divided into a controller and a dynamic compensator. Alternatively, the control system includes a controller and a separate dynamic compensator.

Dynamic compensation can be based on a different algorithm. For example, an empirical compensation based on simulation or experiments can be implemented. The compensation specified for desired changes can be determined. The specified compensations can be stored in look up tables or approximated by polynomial functions.

A fast and numerically simple compensation can be carried out in the Laplace transformed frequency domain. According to an exemplary embodiment of the present disclosure, the dynamics of at least one of the air, fuel gas, liquid fuel, water, steam supply channels, actuators, and control elements are described with a transfer function. In this embodiment the dynamic compensation and/or acceleration of at least one command signal for the fuel gas, liquid fuel, water and/or steam supply system is approximated with transfer functions.

For example, the fuel command $\dot{m}_{fuel,i}^{CMD}$ is compensated to a dynamically compensated fuel command $\dot{m}_{fuel,i}^{COMP}$ as follows.

$$L(\dot{m}_{fuel,i}^{COMP}) = G_{fuel,i}^{COMP}(s) \cdot L(\dot{m}_{fuel,i}^{CMD}) \quad \text{equation 4}$$

where $G_{fuel,i}^{COMP}$ is the compensator for the fuel channel i. Similarly, $$L(\dot{m}_{w/s,j}^{COMP}) = G_{w/s,j}^{COMP}(s) \cdot L(\dot{m}_{w/s,j}^{CMD}) \quad \text{equation 5}$$

$$L(\dot{m}_{air,k}^{COMP}) = G_{air,k}^{COMP}(s) \cdot L(\dot{m}_{air,k}^{CMD}) \quad \text{equation 6}$$

where $G_{w/s,j}^{COMP}$ and $G_{air,k}^{COMP}$ are the transfer functions describing the compensators for the water/steam channel j and the air channel k.

Compared to the dynamics of the fuel channels the actuators can be fast and it can be assumed that they are perfectly calibrated. Then the following assumption can be used for simplification:

$$\dot{m}_{fuel,i}^{COMP} = \dot{m}_{fuel,i}^{ACTUR} \quad \text{equation 7}$$

$$\dot{m}_{w/s,j}^{COMP} = \dot{m}_{w/s,j}^{ACTUR} \quad \text{equation 8}$$

$$\dot{m}_{air,k}^{COMP} = \dot{m}_{air,k}^{ACTUR} \quad \text{equation 9}$$

Replacing the actuator the compensated value by the actuator value according to equations 7 to 9 in equations 4 to 6 and applying the resulting equations for the actuator value to the correlations describing the supply system to the combustor (equations 1 to 3) one arrives at:

$$L(\dot{m}_{fuel,i}^{CMBST}) = G_{fuel,i}(s) \cdot G_{fuel,i}^{COMP}(s) \cdot L(\dot{m}_{fuel,i}^{CMD}) \quad \text{equation 10}$$

$$L(\dot{m}_{w/s,j}^{CMBST}) = G_{w/s,j}(s) \cdot G_{w/s,j}^{COMP}(s) \cdot L(\dot{m}_{w/s,j}^{CMD}) \quad \text{equation 11}$$

$$L(\dot{m}_{air,k}^{CMBST}) = G_{air,k}(s) \cdot G_{air,k}^{COMP}(s) \cdot L(\dot{m}_{air,k}^{CMD}) \quad \text{equation 12}$$

In order to synchronize the changes in the different mass flows equations 10 to 12 show that the product of the transfer functions describing the supply system and the compensation functions have to be identical:

$$G_{fuel,i}(s) \cdot G_{fuel,i}^{COMP}(s) = G_{w/s,j}(s) \cdot G_{w/s,j}^{COMP}(s) = G_{air,k}(s) \cdot G_{air,k}^{COMP}(s) \quad \text{equation 13}$$

This means that the transfer functions between the mass flow commands and the mass flows at the combustor inlet are the same for all channels. This leads to synchronized fuel, water/steam and air mass flows at the combustor inlet during transient operations:

$$\frac{L(\dot{m}_{fuel,ch,i}^{CMBST})}{L(\dot{m}_{fuel,ch,i}^{CMD})} = \frac{L(\dot{m}_{W/S,ch,j}^{CMBST})}{L(\dot{m}_{W/S,ch,j}^{CMD})} = \frac{L(\dot{m}_{air,ch,k}^{CMBST})}{L(\dot{m}_{air,ch,k}^{CMD})} \quad \text{equation 14}$$

The transfer functions can be synchronized according to this procedure for only two mass flows, for example air and fuel mass flow or in analogue way for any other mass flows.

In order accelerate the control, the compensators shall be designed to be phase lead, so that the delays caused by the fuel, water/steam and air supply channels can be moderated.

To simplify the compensation of command signals in a group of commands in another exemplary embodiment the command signal of the system with the slowest dynamics can be used without any compensation and the faster systems can be compensated to match the slow system.

Thus, for example if the fuel system is the slowest system, equation 10 without compensation becomes:

$$L(\dot{m}_{fuel,i}^{CMBST}) = G_{fuel,i}(s) \cdot L(\dot{m}_{fuel,i}^{CMD}) \quad \text{equation 15}$$

$$\text{or } G_{fuel,i}(s) = \cdot L(\dot{m}_{fuel,i}^{CMBST})/L(\dot{m}_{fuel,i}^{CMD}) \quad \text{equation 16}$$

To obtain the compensation function for example for air one can insert equation 16 in equation 14 to obtain:

$$G_{fuel,i}(s) = \cdot L(\dot{m}_{air,i}^{CMBST})/L(\dot{m}_{air,i}^{CMD}) \quad \text{equation 17}$$

and combing with equation 12 arrives at:

$$G_{fuel,i}(s) = G_{air,k}(s) \cdot G_{air,k}^{COMP}(s) \quad \text{equation 18}$$

and finally at:

$$G_{air,k}^{COMP}(s) = G_{fuel,i}(s)/G_{air,k}(s) \quad \text{equation 19}$$

Analogously the compensation function for water/steam or any other mass flow command in the system can be derived. It should be understood that any other slowest system can be used to derive the compensation functions.

In general the compensation function $G_{fast,k}^{COMP}(s)$ of a channel with fast dynamics can be written as a function of the transfer function of the slowest channel $G_{slow,i}(s)$ and the fast channel $G_{fast,k}(s)$ according to equation 20:

$$G_{fast,k}^{COMP}(s) = G_{slow,i}(s)/G_{fast,k}(s) \quad \text{equation 20}$$

Thus, according to another exemplary embodiment described herein the dynamics of the slowest of the: air, fuel gas, liquid fuel, water, and steam supply systems remain dynamically uncompensated and are described with a transfer function. The dynamics of at least one of fuel gas, liquid fuel, water, and steam supply systems with faster dynamics are described with a transfer function and the dynamic compensation of at least one command signal for the air, fuel gas, liquid fuel, water and/or steam supply system carried out using the transfer functions.

According to an exemplary embodiment, in a system with one or many fuel gas supply channels with similar dynamics, the fuel gas cannels remain dynamically uncompensated and are described with a transfer function. The dynamics of the air supply system are described with transfer functions and are dynamically compensated. The dynamic compensation and/or acceleration of the command signal for air supply is calculated using the transfer functions.

In a further embodiment, in a system with several fuel gas supply systems with different dynamics, the dynamics of the slowest fuel gas system remains dynamically uncompensated. The dynamics of air supply and faster fuel gas, and/or liquid fuel supply systems are described with transfer functions. The command signal for air supply and faster fuel gas, and/or liquid fuel supply channels are dynamically compensated, wherein the dynamic compensation and/or an acceleration are derived from the transfer functions.

Other exemplary embodiments of the present disclosure are directed to a control system for a gas turbine, which is designed to carry out the exemplary methods already discussed.

The control system is designed to control a gas turbine including a compressor with variable inlet guide vanes, a combustor, a turbine, a controller, measurement devices, actuators, and inlet air supply channels, and supply channels for fuel gas, and/or liquid fuel, and/or water and/or steam.

The exemplary control system can be designed to determine the command values for an inlet air mass flow and at least one of: fuel gas mass flow, liquid fuel mass flow, water mass flow, steam mass flow. According to the disclosure the control system further includes a dynamic compensator for controlling at least one major mass flow entering the combustor, where the major mass flow includes air, fuel gas, and/or liquid fuel, and/or water, and/or steam mass flows.

During transient operation, at least one command signal is corrected in order to compensate for the different system dynamics of the different mass flow supply systems in order to synchronize the transient changes in fuel, water, steam, and combustion air mass flows, reaching the combustor. By synchronizing the transient changes the fuel to air ratio, or if applicable also the steam and/or water to fuel ratio, of the fluids reaching the combustor stay within the combustible limit.

According to an exemplary embodiment, the control system includes an accelerator to moderate the slow dynamics of the air, fuel gas, liquid fuel, water and/or steam supply systems before or after the value is dynamically compensated in order to allow faster transient changes in operation. The accelerator can also be combined with the dynamic compensator for fuel supply, the dynamic compensator for water or steam supply, and/or the dynamic compensator for air supply.

According to another exemplary embodiment the dynamic compensator for air supply system, includes a transfer function, which describes the dynamics of at least one of the: air, fuel gas, liquid fuel, water, and steam supply systems.

In a further embodiment, the control system for controlling a gas turbine has no dynamic compensator for the command signal for the slowest supply system of the combustor, but a dynamic compensator is provided for at least one supply system with faster dynamics. This means that the command signal is directly used for control of the slowest signal. More specifically, no dynamic compensator is provided for the slowest of air, fuel gas, liquid fuel, water and steam supply systems and at least one compensator is provided for at least one of: the fuel gas, liquid fuel, water, and steam supply systems with faster dynamics.

In another, more specific embodiment of the control system no dynamic compensator is provided for fuel gas channels and a dynamic compensator is provided for the air supply system.

In addition to the control system, exemplary embodiments of the present disclosure are directed to a gas turbine that includes an exemplary control system already discussed.

In the Laplace transformed domain the physical output variable can be expressed by Laplace transfer function. The parameters of these transfer functions can be identified by step response tests. These tests are either carried out on the real engine or by a detailed dynamic model.

The same or functionally identical elements can be provided with the same designations below. The values and dimensional specifications indicated below are only exemplary values and do not constitute any restriction of the disclosure to such express dimensions.

Figure 2:
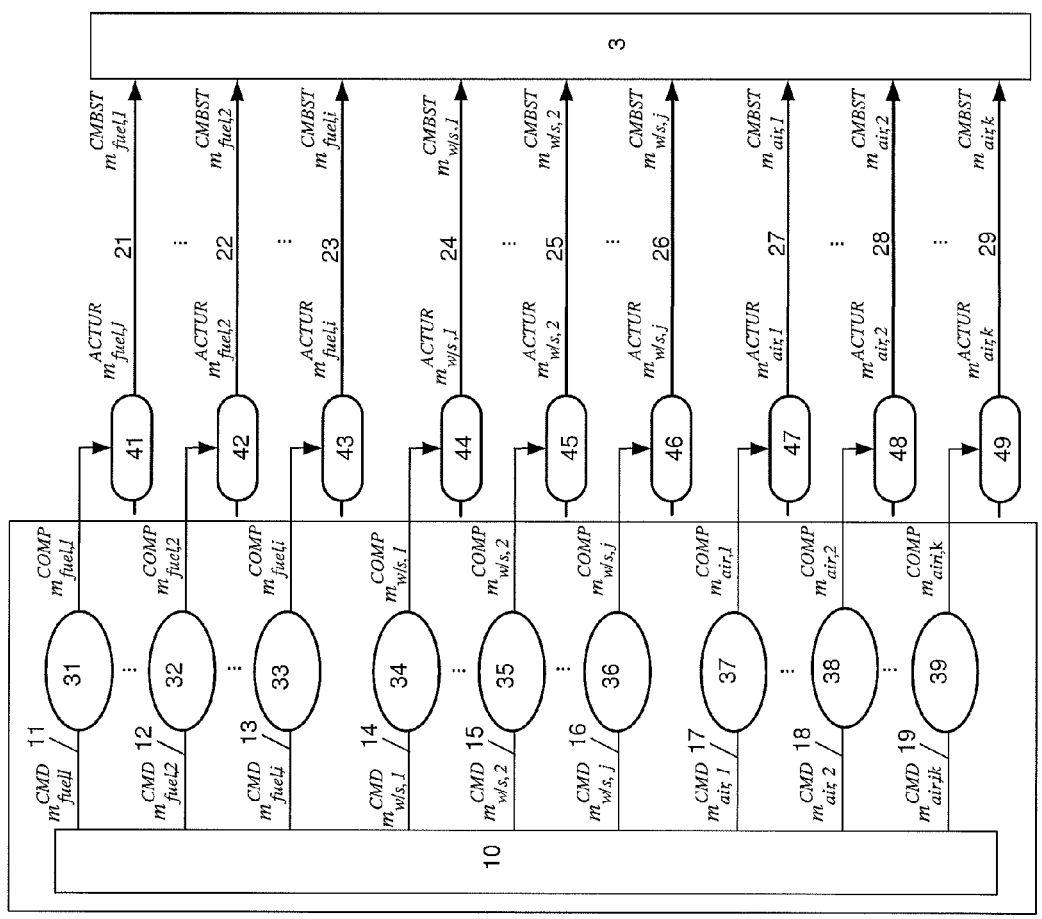
FIG. 2 shows a gas turbine control system in accordance with an exemplary embodiment of the present disclosure.

FIG. 2 shows a gas turbine control system in accordance with an exemplary embodiment of the present disclosure. FIG. 2 is based on FIG. 1 and shows a controller 10, control lines 11, . . . , 19, actuators 41, . . . , 49, and supply channels 21, . . . , 29 to a combustor. In addition the control system 30 of FIG. 2 includes dynamic compensators 31, . . . , 39. The commanded fuel mass flows $\dot{m}_{fuel,i}^{CMD}$ are compensated by the dynamic compensators for fuel supply 31, . . . , 33, the commanded water/steam mass flows $\dot{m}_{w/s,j}^{CMD}$ are compensated by the dynamic compensators for water/steam supply 34, . . . , 36, and the commanded air mass flows $\dot{m}_{air,i}^{CMD}$ are compensated by the dynamic compensators for air supply 37, . . . , 39.

Figure 3:
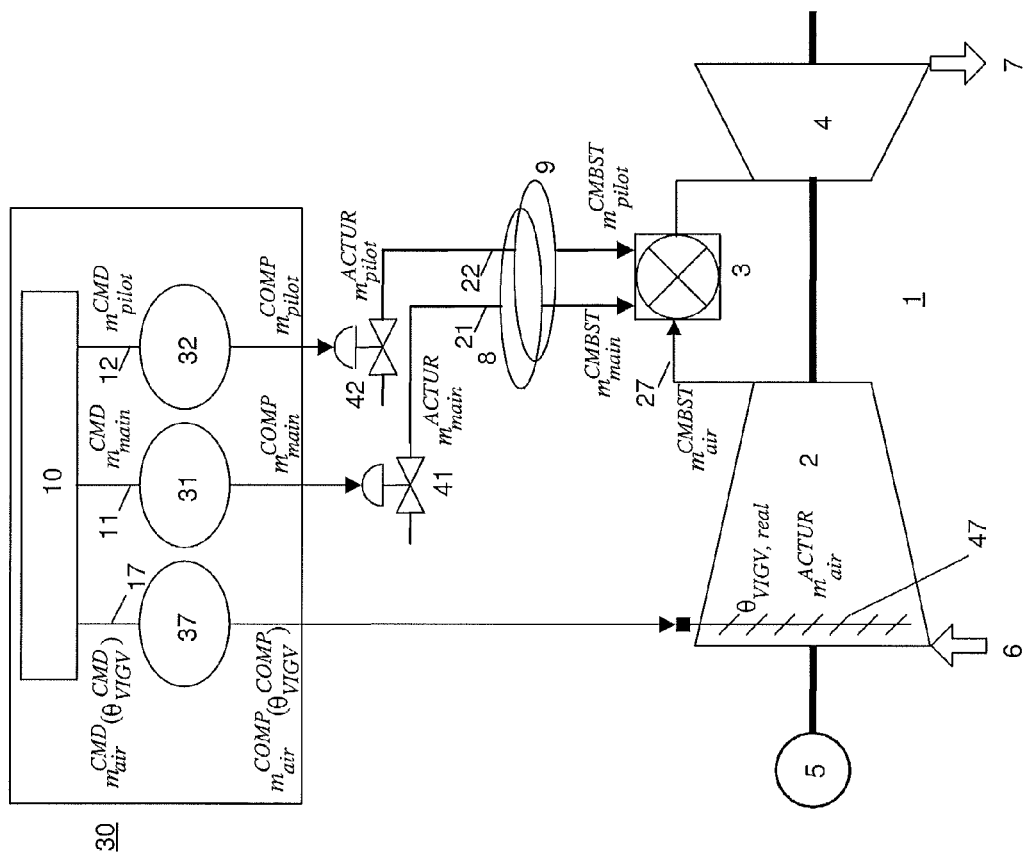
FIG. 3 shows in accordance with an exemplary embodiment of the present disclosure a gas turbine with a control system.

In the example of FIGS. 1 and 3 the water and steam supply are presented as alternatives. However, this is in no way limiting and the disclosure can be implemented to gas turbines with water and steam injection as desired.

FIG. 3 shows in accordance with an exemplary embodiment of the present disclosure a gas turbine with a control system. The gas turbine 1 includes a controller 10, dynamic compensators 31, 32, 37, actuators 41, 42, 47, control lines 11, 12, 17, and supply channels 21, 22, 27 to a combustor 3.

The gas turbine 1 of FIG. 3 has two fuel gas supply channels 21, 22, one to a main burner group and another one to a pilot burner group. The main burner group is a premix group and has much stricter rich and lean limits. It determines the combustors operation range.

In FIG. 3 $\dot{m}_{main}^{CMBST}$, $\dot{m}_{pilot}^{CMBST}$ and $\dot{m}_{air}^{CMBST}$ are the main fuel gas, pilot fuel gas and air mass flows at the combustor inlet. $\dot{m}_{main}^{ACTUR}$ and $\dot{m}_{pilot}^{ACTUR}$ are the fuel gas mass flows at the actuators 41, 42, i.e. at the fuel gas control valves. The actuators for the air mass flow 47 are the variable inlet guide vanes (VIGV). The air mass flow at the actuator $\dot{m}_{air}^{ACTUR}$ is the air mass flow at the compressor inlet. The controller 10 generates the mass flow commands for main fuel $\dot{m}_{main}^{CMD}$, for pilot fuel $\dot{m}_{pilot}^{CMD}$, and for airflow $\dot{m}_{air}^{CMD}$. The mass flow commands are compensated for different dynamics in the dynamic compensators for fuel 31, 32, and air 37 and the compensated commands $\dot{m}_{main}^{COMP}$, $\dot{m}_{pilot}^{COMP}$, and $\dot{m}_{air}^{COMP}$ are sent to the actuators 41, 42, 47.

A VIGV command $\theta_{VIGV}^{CMD}$ can be generated by the controller 10 instead CMD of an air mass flow command $\dot{m}_{air}^{CMD}$. Furthermore, the fuel mass flow commands $\dot{m}_{main}^{COMP}$ and $\dot{m}_{pilot}^{COMP}$ can be converted into valve strokes. For the sake of simplification, the mass flows are still used hereafter instead of VIGV position and control valves strokes.

The fuel gas supply channels can have big volumes in their fuel distribution systems 8, 9. Their system dynamics can be approximated by a first order delay with a transport delay according to:

$$L(\dot{m}_{main}^{CMBST}) = \qquad \text{equation 21}$$
$$G_{main}(s) \cdot L(\dot{m}_{main}^{ACTUR}) = \frac{1}{1 + t_{main} \cdot s} e^{-L_{main} s} \cdot L(\dot{m}_{main}^{ACTUR})$$

$$L(\dot{m}_{pilot}^{CMBST}) = \qquad \text{equation 22}$$
$$G_{pilot}(s) \cdot L(\dot{m}_{pilot}^{ACTUR}) = \frac{1}{1 + t_{pilot} \cdot s} e^{-L_{pilot} s} \cdot L(\dot{m}_{pilot}^{ACTUR}),$$

where $L_{main}$ and $L_{pilot}$ are transport delay times of the main gas channel 21 and pilot gas channel 22, and $t_{main}$ and $t_{pilot}$ are delay time constants, which depend on fuel gas distribution system volumes.

The compressor 2 supplies air to the combustor 3 and uses variable inlet guide vane (VIGV) 47 to control the mass flow. Its dynamics can be approximated by a second order delay with a transport delay according to:

$$L(\dot{m}_{air}^{CMBST}) = G_{air}(s) \cdot L(\dot{m}_{air}^{ACTUR}) = \qquad \text{equation 23,}$$
$$\frac{1}{(1 + t_{VIGV} \cdot s)(1 + t_{air} \cdot s)} e^{-L_{air} s} \cdot L(\dot{m}_{air}^{ACTUR}),$$

where, $L_{air}$ is the transport delay time of the compressor 2. $t_{VIGV}$ is the time constant of the VIGV servo and $t_{air}$ the delay time constant, which depends on the compressor volume.

In exemplary embodiments described herein, $t_{main}$ and $t_{pilot}$ can be much bigger than $t_{VIGV}$ and $t_{air}$, and $L_{main}$ and $L_{pilot}$ are longer than $L_{air}$. Hence, the fuel gas channels 21, 22 have slower dynamics than the compressor 2.

As for equations 7 and 9 the dynamics of the actuators 41, 42, are fast compared to those of the fuel channels 21, 22 and it can be assumed that they are perfectly calibrated. Therefore, equations 7 and 9 can be applied. If no compensation is applied to the main fuel, and with the air channel (compressor 2) being the fast channel and the main fuel gas channel 21 being the slowest channel equations 21 and 23 can be used to obtain the transfer functions $G_{main}(s)$ and $G_{air}(s)$, and inserted in equation 20 to obtain the specified compensation function for the pilot gas:

$$G_{pilot}^{COMP}(s) = G_{fast,k}^{COMP}(s) = \qquad \text{equation 24}$$
$$G_{slow,i}(s) / G_{fast,k}(s) = \frac{1 + t_{pilot} \cdot s}{1 + t_{main} \cdot s} e^{-(L_{main} - L_{pilot})s},$$

and the specified compensation function for the air mass flow:

$$G_{air}^{COMP}(s) = G_{fast,k}^{COMP}(s) = G_{slow,i}(s) / G_{fast,k}(s) = \qquad \text{equation 25}$$
$$\frac{(1 + t_{VIGV} \cdot s)(1 + t_{air} \cdot s)}{1 + t_{main} \cdot s} e^{-(L_{main} - L_{air})s},$$

To accelerate the system dynamics a compensator $(1+t_{main} \cdot s)/(1+t_{accel} \cdot s)$ can be selected, where $t_{accel}$ is a virtual time constant. It shall be smaller than the time constant of the slowest supply channel; in this case it is smaller than the time constant of the main fuel gas supply $t_{main}$ in order to make the compensator phase lead.

By applying the compensator to equations 24 and 25 for the fast systems one obtains a compensation function for the accelerated pilot gas:

$$G'^{COMP}_{pilot}(s) = \frac{1+t_{pilot} \cdot s}{1+t_{accel} \cdot s} e^{-(L_{main}-L_{pilot})s}, \quad \text{equation 26}$$

and a compensation function for the accelerated air mass flow:

$$G'^{COMP}_{air}(s) = \frac{(1+t_{VIGV} \cdot s)(1+t_{air} \cdot s)}{1+t_{accel} \cdot s} e^{-(L_{main}-L_{air})s}, \quad \text{equation 27}$$

The resulting compensation function for the main fuel gas flow is unity times the compensator $(1+t_{main} \cdot s)/(1+t_{accel} \cdot s)$ for acceleration:

$$G'^{COMP}_{main}(s) = \frac{1+t_{main} \cdot s}{1+t_{accel} \cdot s} \quad \text{equation 28}$$

Again if the dynamics of the actuators are fast compared to those of the fuel channels and if it can be assumed that they are perfectly calibrated equations 7 and 9 can be applied and the compensated mass flows are equal to the actuator mass flows. Therefore, equations 26 and 27 can be applied to equations 21 and 22, respectively, as well as equation 28 to equation 23. All lead to the following accelerated overall transfer function G"(s):

$$G''^{CMBST}_{pilot}(s) \frac{L(\dot{m}^{CMBST}_{pilot})}{L(\dot{m}^{CMD}_{pilot})} = G''^{CMBST}_{air}(s) = \frac{L(\dot{m}^{CMBST}_{air})}{L(\dot{m}^{CMD}_{air})} = G''^{CMBST}_{main}(s) \frac{L(\dot{m}^{CMBST}_{main})}{L(\dot{m}^{CMD}_{main})} = \frac{1}{1+t_{accel} \cdot s} e^{-L_{main}s}, \quad \text{eq. 29}$$

This means that the fuel gas and air mass flows at the combustor inlet can be synchronized and accelerated by implementing the compensators defined by equations 26 to 28.

In exemplary embodiments of the disclosure, the virtual time constant $t_{accel}$ shall be carefully determined. On one hand, it shall be smaller than $t_{main}$; on the other hand, it shall not be too small. If the acceleration is to high, i.e. the time constant $t_{accel}$ too small the whole closed loop control may become unstable. The ratio of acceleration time constant $t_{accel}$ to the main time constant $t_{main}$ is in the range of 0.2 to 0.8, for example. and preferably in the range of 0.4 to 0.6 to allow noticeable stable moderation of the dynamic system.

Thus, it will be appreciated by those skilled in the art that the present disclosure can be embodied in other specific forms without departing from the spirit or essential characteristics thereof. The presently disclosed embodiments are therefore considered in all respects to be illustrative and not restricted. The scope of the disclosure is indicated by the appended claims rather than the foregoing description and all changes that come within the meaning and range and equivalence thereof are intended to be embraced therein.

DESIGNATIONS 1 gas turbine
2 compressor
3 combustor
4 turbine
5 generator
6 inlet air
7 exhaust gas
8 main fuel gas distribution system
9 pilot gas distribution system
10 Controller
11, . . . , 13 Control lines for fuel supply
14, . . . , 16 Control lines for water and/or steam supply
17, . . . , 19 Control lines for air supply
21, . . . , 23 Fuel supply channels
24, . . . , 26 Water and/or steam supply channels
27, . . . , 29 Air supply channels
30 Control system
31, . . . , 33 Dynamic compensator for fuel supply
34, . . . , 36 Dynamic compensator for water and/or steam supply
37, . . . , 39 Dynamic compensator for air supply
41, . . . , 43 Actuator for fuel supply
44, . . . , 46 Actuator for water and/or steam supply
47, . . . , 49 Actuator for air supply
$\dot{m}_{main}^{CMBST}$ main fuel gas mass flow at the combustor inlet
$\dot{m}_{pilot}^{CMBST}$ pilot gas mass flow at the combustor inlet
$\dot{m}_{air}^{CMBST}$ air mass flow at the combustor inlet
$\dot{m}_{fuel,i}^{CMBST}$ fuel mass flow i at the combustor inlet
$\dot{m}_{w/s,j}^{CMBST}$ water/steam mass flow j at the combustor inlet
$\dot{m}_{air,k}^{CMBST}$ air mass flow k at the combustor inlet
$\dot{m}_{main}^{ACTUR}$ main fuel gas mass flows at the actuators
$\dot{m}_{pilot}^{ACTUR}$ pilot fuel gas mass flows at the actuators
$\dot{m}_{air}^{ACTUR}$ air mass flow at the actuator, i.e., VIGV
$\dot{m}_{fuel,i}^{ACTUR}$ fuel mass flow i at the actuators
$\dot{m}_{w/s,j}^{ACTUR}$ water/steam mass flow j at the actuators
$\dot{m}_{air,k}^{ACTUR}$ air mass flow k at the actuator, i.e., VIGV
$\dot{m}_{main}^{CMD}$ main fuel mass flow command generated by the controller 10
$\dot{m}_{pilot}^{CMD}$ pilot fuel mass flow command generated by the controller 10
$\dot{m}_{air}^{CMD}$ air mass flow command generated by the controller 10
$\dot{m}_{fuel,i}^{CMD}$ fuel mass flow command i generated by the controller 10
$\dot{m}_{w/s,j}^{CMD}$ water/steam mass flow command j generated by the controller 10
$\dot{m}_{air,k}^{CMD}$ air mass flow k command generated by the controller 10
$\dot{m}_{main}^{COMP}$ compensated main fuel mass flow command generated by dynamic compensator for main fuel supply 31
$\dot{m}_{pilot}^{COMP}$ compensated pilot fuel mass flow command generated by dynamic compensator for pilot fuel supply 32
$\dot{m}_{air}^{COMP}$ compensated air mass flow command generated by dynamic compensator for air supply 37
$\dot{m}_{fuel,i}^{COMP}$ compensated fuel mass flow command i generated by dynamic compensator for fuel supply 31, . . . , 33
$\dot{m}_{w/s,j}^{COMP}$ compensated water/steam mass flow command j generated by dynamic compensator for pilot fuel supply 34, . . . , 36

$\dot{m}_{air,k}^{COMP}$ compensated air mass flow command k generated by dynamic compensator for air supply 37, ..., 39
VIGV variable inlet guide vane
$\theta_{VIGV}$ virtual variable inlet guide vane position
$\theta_{VIGV,cmd}$ commanded variable inlet guide vane position
$\theta_{VIGV,real}$ variable inlet guide vane position

What is claimed is:

1. A control system for controlling a gas turbine having a compressor with variable inlet guide vanes,
a combustor,
a turbine,
a controller, measurement devices, actuators, inlet air supply channels, and supply channels for fuel supply, and water, or steam supply,
wherein each supply channel is associated with a respective supply system, and
wherein the controller determines command values for an inlet air mass flow, fuel mass flow, and water or steam mass flow,
the control system comprising:
   a dynamic compensator for the fuel supply, a dynamic compensator for the water or steam supply, and a dynamic compensator for an air supply to the combustor; and
   a processor configured to
      correct at least one command signal during transient operation to compensate for differences in dynamics of the respective supply system to synchronize resulting changes in the fuel mass flow, the water or steam mass flow, and the inlet air mass flow, which enter the combustor, so that a fuel to air ratio stays within combustible limit,
      wherein no dynamic compensation is provided for the command signal for one of the inlet air mass flow, the fuel mass flow, and the water or steam mass flow with a slowest speed of transient change, and
      wherein a dynamic compensation is provided for at least one of the inlet air mass flow, the fuel mass flow, and the water or steam mass flow with a faster speed of transient change.

2. The control system according to claim 1, wherein at least one of the dynamic compensator for the fuel supply, the dynamic compensator for the water or steam supply, and the dynamic compensator for the air supply, comprises an accelerator to moderate slow dynamics of at least one of the inlet air mass flow, the fuel mass flow, and the water or steam mass flow before or after a value is dynamically compensated in order to allow faster transient changes in operation.

3. The control system according to claim 1 in combination with the gas turbine, wherein at least one of the dynamic compensator for the fuel supply, the dynamic compensator for the water or steam supply, and the dynamic compensator for the air supply, comprises a transfer function, which describes dynamics of at least one of the inlet air mass flow, the fuel mass flow, and the water or steam mass flow.

4. The control system according claim 1, wherein the fuel supply have no dynamic compensator compensation and the air supply includes a dynamic compensation.

5. The control system according to claim 2, wherein at least one of the dynamic compensator for the fuel supply, the dynamic compensator for the water or steam supply, and the dynamic compensator for the air supply, comprises a transfer function, which describes dynamics of at least one of the the inlet air mass flow, the fuel mass flow, and the water or steam mass flow.

6. The control system according to claim 3, wherein no dynamic compensation is provided for the fuel supply gas and a dynamic compensation for the air supply is provided.

7. A gas turbine comprising a control system according to claim 1.

* * * * *